Dec. 9, 1930.  E. D. LAMPHERE, JR  1,784,603
FROZEN CREAM CUTTER
Filed Jan. 16, 1929  2 Sheets-Sheet 1

Inventor
E.D.Lamphere, Jr.

By Clarence A. O'Brien
Attorney

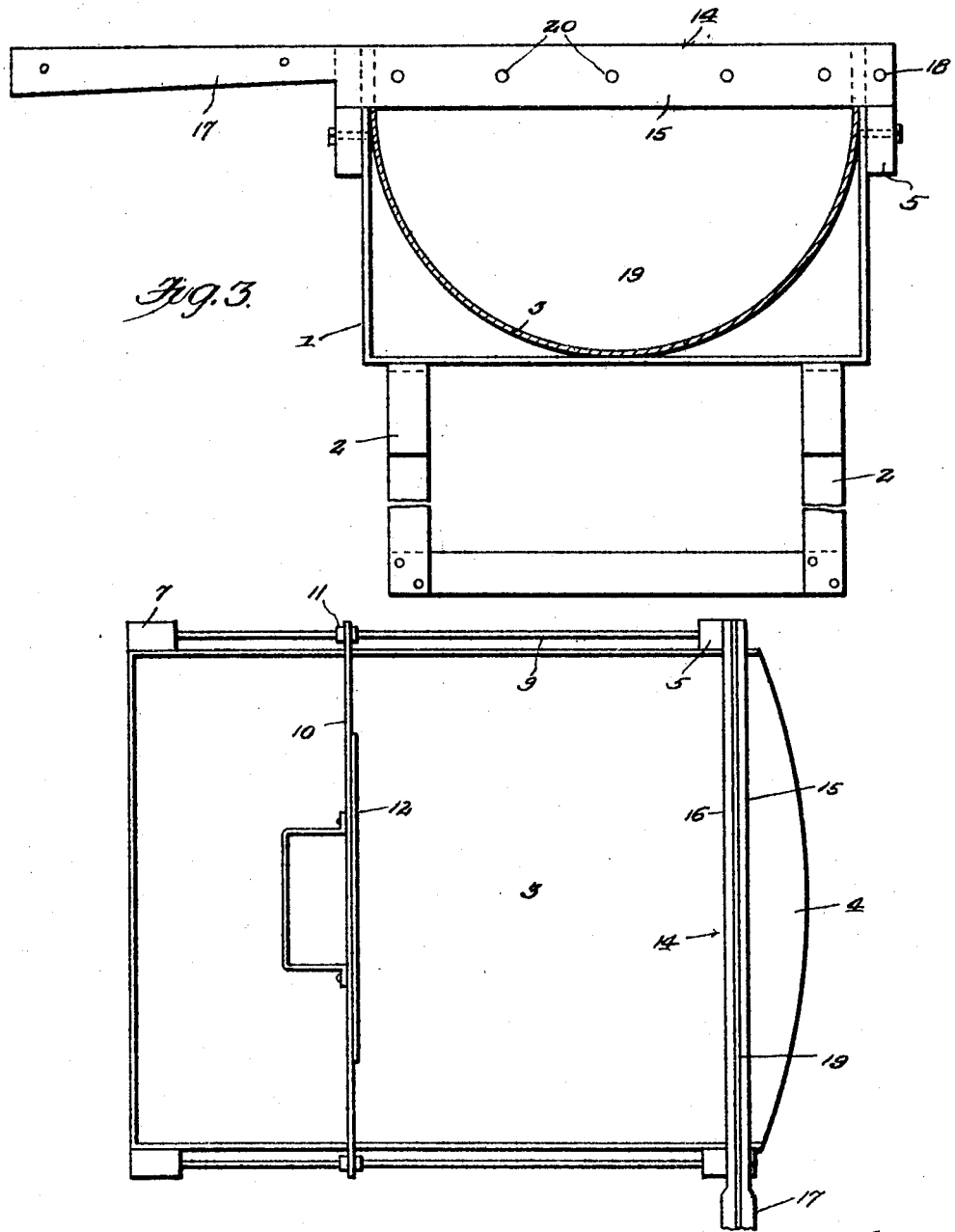

Patented Dec. 9, 1930

1,784,603

UNITED STATES PATENT OFFICE

EMMETT DELBERT LAMPHERE, JR., OF WEST RUTLAND, VERMONT

FROZEN-CREAM CUTTER

Application filed January 16, 1929. Serial No. 332,981.

The present invention relates to improvements in devices for use in creameries and has reference more particularly to a frozen cream slicer or cutter.

In creameries there is often a large surplus of creams left over in the spring of the year which must necessarily be stored away for use at a later date and this surplus cream is frozen by the well known freezing process at which the frozen cream is stored in five gallon cans and maintained in this frozen condition until it is time to use the surplusage.

One of the important objects of the invention is therefore to provide a cutting means whereby the frozen cream that is removed from the cans may be cut up into slices of unifrom size so that the slices may be easily melted in a pasturizer and raised to a temperature of approximately one hundred and forty-five degrees Fahrenheit.

By cutting the frozen cream into small slices, considerable time will be saved in melting the cream.

A further object is to provide a frozen cream slicer or cutter that includes a container adapted to receive the cylinder of frozen cream, a follower being arranged for movement along the container to feed the frozen cream to a cutter that is not at the forward end of the container, the device being arranged on a bracket structure that is capable of being hung on the side of a conventional pasteurizer so that as the frozen cream is sliced, the slicers will drop into the pasteurizer. In this manner, the frozen cream can be handled in a sanitary condition as the operator dies not touch the cream with his hands after the same has been emptied from its storage can into the container of the cutting device.

Another object is to provide a device of the above mentioned character that is simple in construction, inexpensive, strong and durable and further well adapted to the purposes for which it is designed.

Other objects and advantages will become apparent during the course of the following description.

In the accompanying drawing, forming a part of this specification, and in which like numerals indicate like parts throughout the same:

Figure 2 is a top plan view thereof,

Figure 3 is a vertical sectional view taken approximately on the line 3—3 of Figure 1, looking in the direction of the arrows.

Figure 1:
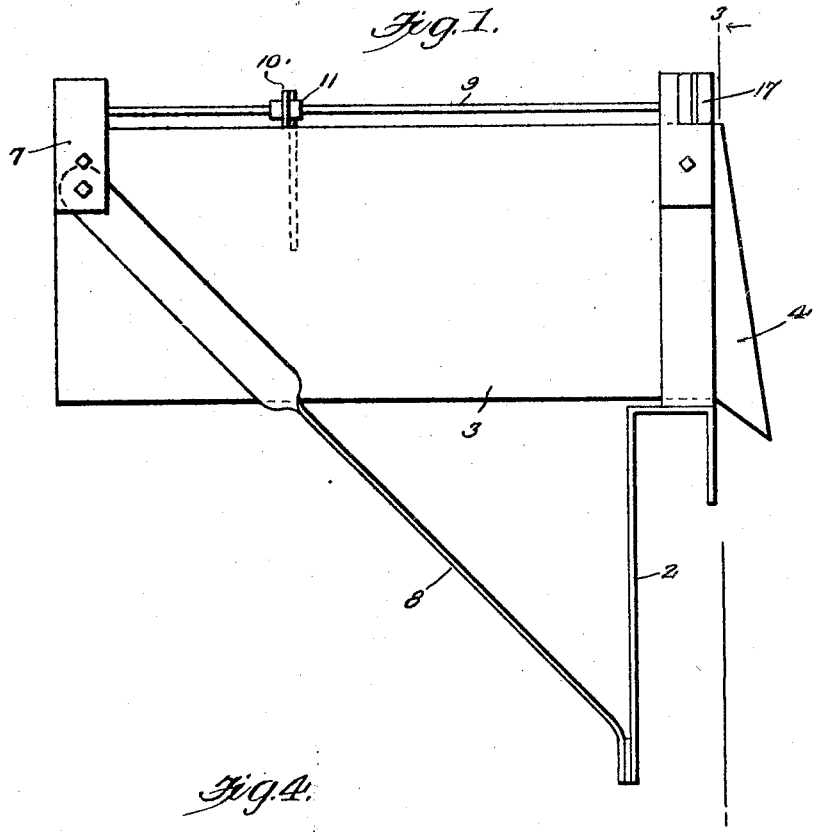
Figure 1 is a side elevation of the frozen cream cutter embodying my invention.
Figure 4:
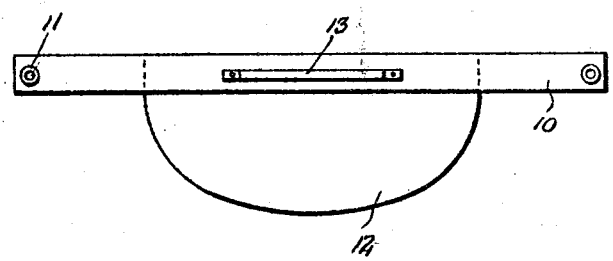
Figure 4 is a detail view of the slidable follower.

In the drawings wherein for the purpose of illustration is shown the preferred embodiment of my invention, the numeral 1 designates a substantially U-shaped bracket that has depending from the bottom portion thereof, the inter-connected hooks 2 that are adapted to be detachably engaged over the side of a pasteurizer of any conventional construction, not shown, whereby the cutting device embodying the present invention will be properly supported.

The cutting device includes the provision of a substantially semi-cylindrical container 3 whose forward end is secured within the U-shaped bracket 1, the forward end of the container being open while the rear end is closed.

A flared discharge mouth or lip 4 extends from the forward edge of the container 3 for guiding the slight pieces of frozen cream into the pasteurizer where the same are melted.

Figure 6:
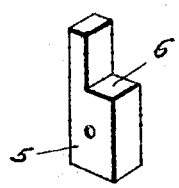
Figure 6 is a detail perspective view of one of the blocks secured on the supporting structure adjacent the forward end of the container.

A pair of blocks such as are shown at 5 in Figure 6 are secured on the outer sides of the upper ends of the arms of the U-shaped bracket 1 and each of these blocks is cut away at its upper end to form a shoulder 6. Additional blocks 7 are secured to the outer faces of the respective sides of the semi-cylindrical container 3 at the upper rear corners thereof and suitable braces 8 extend between the lower portions of the blocks 7 and the leg members of the hooks 2 as shown in Figure 1.

A pair of guide rods 9 extend longitudinally on opposite sides of the receptacle or container 3, these rods being secured at their ends in the respective pairs of front and rear blocks.

A bar 10 is formed at its respective ends with suitable openings 11 to accommodate the rods 9 whereby said bar is slidable along the rod and carried by an intermediate portion of the bar is the arcuate shaped follower 12 that extends downwardly into the container 3 for the purpose of leading the frozen cream toward the cutting blade located at the forward open end of the container and a suitable handle 13 is attached to the rear side of the intermediate portion of the cross bar for actuating the same.

Screen like bushings are disposed through the openings formed in the ends of the cross bar 10 through which the rods 9 extend and the upper portion of the follower is secured to the front face of the intermediate portion of the cross bar.

The invention further comprehends the provision of a vertically swinging cutting unit denoted generally by the numeral 14 and this unit includes a pair of elongated bars 15 and 16 respectively that are secured together and these bars terminate at one end in a handle portion 17 that extends beyond one side of the container 3.

Figure 5:
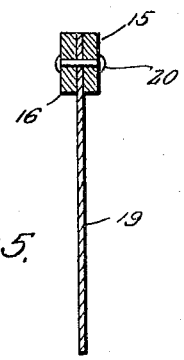
Figure 5 is a sectional view through the knife.

The other ends of the bars are pivotally connected to the adjacent shouldered block 5 as at 18. A substantially arcuate shaped cutting blade 19 is clamped between the bars 15 and 16 as suggested very clearly in Figure 5, the securing means that extend through the bars and the upper edge portion of the arcuate cutting blade being shown at 20.

The lower edge of the blade is sharpened and the blade is capable of swinging downwardly into the arcuate shaped container 3 for cutting the frozen body of cream into small slices as is obvious from the construction shown in the drawings.

When the handle 17 is in a lowered position, it will be observed that the lower edges of the bar rest on the shoulder 6 of the front blocks 5.

After the cutting unit 14 has been lowered and one slice is cut off from the frozen body of cream, the cut off portion will drop into the pasteurizer and the follower 12 is then moved forwardly to seat the frozen body of cream into position to enable the cutting unit to again cut off another slice and this operation is repeated until the entire block of frozen cream is cut up into small slices and after the frozen cream is sliced, the slices drop into the parteurizer and will be melted whereby to change the frozen cream back to its natural condition for use.

A frozen cream cutting apparatus of this character will save considerable time and labor and will furthermore promote sanitation as it is not necessary for the operator to handle the cream with his hands.

Also the parts of my improved cutter are so constructed to permit the same to be readily and easily cleaned whenever necessary.

While I have shown the preferred embodiment of my invention, it is to be understood that various changes in the size, shape and arrangement of parts may be resorted to without departing from the spirit of the invention and the scope of the appended claim.

Having thus described my invention what I claim as new is:

A frozen-cream cutter of the character described comprising a horizontally disposed container of substantially semi-circular cross-section having one end open, a substantially U-shaped bracket rigidly secured to the open end portion of the container and constituting supporting means therefor, a pair of vertically extending blocks rigidly mounted on the upper end portion of the bracket and projecting above the container, horizontally disposed shoulders on the blocks, a pair of blocks rigidly mounted on the rear end portion of the container and projecting upwardly thereabove, guide rods disposed in spaced parallelism to the opposite side of the container and having their opposite ends rigidly connected to the first and second named pairs of blocks, a bar extending transversely over the container having its opposite end portion slidably mounted on the rods, a follower rigidly mounted on the bar and depending therefrom into the container and a transversely extending knife pivotally mounted on one of the shouldered blocks for swinging movement into the container.

In testimony whereof I affix my signature.

EMMETT DELBERT LAMPHERE, Jr.